DIGITAL DIVIDER FOR INTEGER AND REMAINDER DIVISION OPERATIONS
Filed Dec. 11, 1962
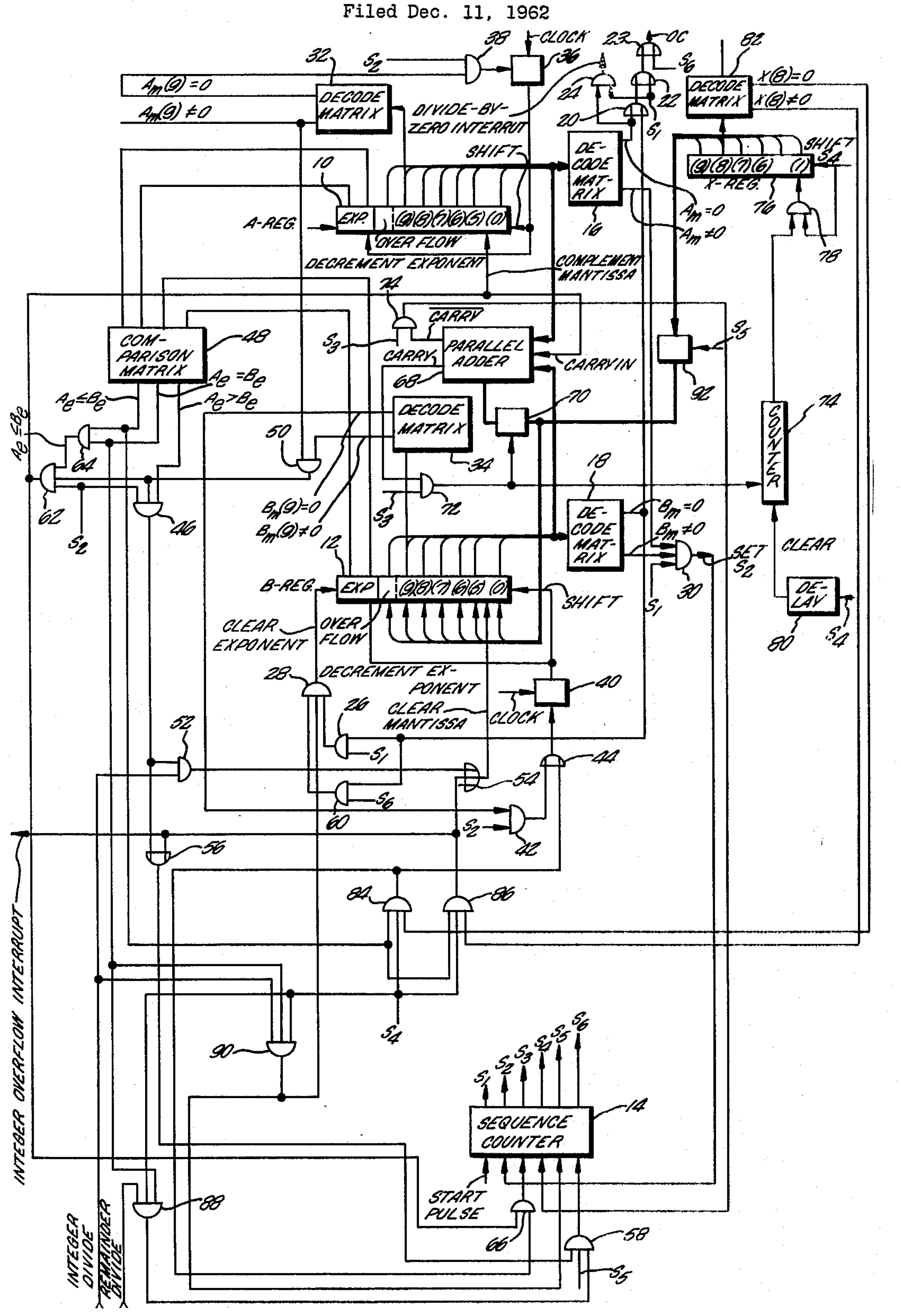

3,254,204
Patented May 31, 1966

3,254,204

DIGITAL DIVIDER FOR INTEGER AND REMAINDER DIVISION OPERATIONS

Jack N. Merner, La Puente, Calif., assignor to Burroughs Corporation, Detroit, Mich., a corporation of Michigan Filed Dec. 11, 1962, Ser. No. 243,787
8 Claims. (Cl. 235—160)

This invention relates to electronic digital processors, and more particularly is concerned with a digital divider for carrying out integer and remainder division operations in floating-point numbers.

The use of floating-point notation in digital computers is well known. In such notation, a number is indicated by a series of digits multiplied by the power of the radix, the power of the radix being determined by where the position of the point in the series of digits is understood to be. For example, in the decimal system, the decimal point may, for example, be assumed to be to the right of the least significant digits in a group of digits. The most significant non-zero digit is shifted to the left so as to eliminate all nonsignificant zeros from the number, and the exponent is adjusted accordingly. Thus the whole number 0096230000 could be expressed as 9623000000 with an exponent of —2 in floating-point notation.

In certain scientific computations involving many multiplications and divisions where the magnitudes of quantities are likely to vary widely, it has been found more desirable to use a floating-point type of notation in which significant zeros are carried as the exponent of the radix. Thus the digits can be multiplied or divided in the usual manner and the exponents added or subtracted to always keep track of the position of the point. The floating-point notation permits very large or very small numbers to be stored since only the significant digits must be stored together with the exponent, whereas in a fixed type of point notation it would be necessary to store all the zeros between the significant non-zeros digits and the point.

In some computations, it is desirable to obtain only the integer digits of a quotient. Or it may be desirable to obtain the remainder resulting when only the integer portion of the quotient is completed. The result of an integer division, which may be expressed "$A \div B$," is the whole number result. The remainder part, which is frequently written as "$A$ mod $B$," is the value which is between zero and B and which differs from A by an integral multiple of B. Stated another way, the remainder division produces the remainder after B has been subtracted from A as many times as possible without getting a negative result. Thus if $A=42$ and $B=9$, integer division produces the result 4, i.e., $42 \div 9=4$. Remainder division produces the result 6, i.e., 42 mod 9=6.

Integer and remainder division are commonly found on digital computers where the operands are carried as integers, but heretofore there has been no facility for integer and remainder division when the operands are expressed as floating-point numbers, except by special programming of the computer. To obtain integer and remainder division on present computers using floating-point notation is clumsy and time consuming.

The present invention is directed to a digital divider circuit capable of performing integer and remainder division directly on numbers carried in floating-point notation. This is accomplished, in brief, by an arrangement in which the dividend and divisor, as stored in a pair of registers, are first normalized by shifting the most significant non-zero digits to the left end of the registers and adjusting the exponents accordingly. This normalization can be done unless the dividend or the divisor is zero. If the divisor is zero, the result is undefined. If the dividend is zero and the divisor is not zero, the result is zero. Assuming that neither operand is zero, after normalization, the exponents are compared. If the exponent of the divisor is greater than the exponent of the dividend, the result for integer divide is known to be zero and the result for remainder divide is known to be equal to the dividend. These results are immediately set as the answer and the operation terminates.

However, if the exponent of the divisor is equal to or less than the exponent of the dividend, division is instituted which computes quotient digits in sequence, starting with the most significant quotient digit, by the successive or over-and-over subtraction method. After each digit of the quotient is generated, the mantissa of the divisor is shifted one place to the left and the exponent of the divisor is reduced by one. After each digit is generated in the quotient, the exponents are again compared. When the exponents are equal, the division operation is complete and an integer quotient and remainder are both present.

A simple example will show the arithmetic steps which are carried out in developing the integer and remainder parts of 443.21÷3.28 by the arrangement of the present invention.

| Dividend | | Divisor | | Partial Quotient |
|---|---|---|---|---|
| Exp. | Mant. | Exp. | Mant. | |
| 2 | 4.4321 | 0 | 3.28 | 0 |
| 2 | 1.1521 | 0 | 3.28 | 1 |
| 1 | 11.521 | 0 | 3.28 | 10 |
| 1 | 8.241 | 0 | 3.28 | 11 |
| 1 | 4.961 | 0 | 3.28 | 12 |
| 1 | 1.681 | 0 | 3.28 | 13 |
| 0 | 16.81 | 0 | 3.28 | 130 |
| 0 | 13.53 | 0 | 3.28 | 131 |
| 0 | 10.25 | 0 | 3.28 | 132 |
| 0 | 6.97 | 0 | 3.28 | 133 |
| 0 | 3.69 | 0 | 3.28 | 134 |
| 0 | 0.41 | 0 | 3.28 | 135 |
| 0 | 0.41 | 0 | 3.28 | 135 |

Answer: $A \div B=135$: $A$ mod $B=0.41 \times 10^0=0.41$.

For a more complete understanding of the invention, reference should be made to the accompanying drawing, wherein the single figure is a schematic block diagram of one embodiment of the invention.

Referring to the drawing in detail, the divisor is stored in floating-point notation in a register 10, designated the A-register. The dividend is stored in a similar register 12, designated the B-register. For simplicity, it will be assumed that numbers are in the decimal system, but the invention is equally applicable to numbers expressed in any other radix. Each register is shown, by way of example only, as including two exponent digits and ten mantissa digits plus an overflow digit. In addition, the registers may include storage for the signs of both the exponent and the mantissa. For the present discussion, the signs will be ignored and so are not shown in the figure.

It is assumed that at the beginning of an integer divide or remainder divide operation, operands are stored in the registers 10 and 12 in floating-point notation. The sequence of operations required to effect an integer divide or remainder divide on these two operands is under the control of a sequence counter 14 which is arranged to advance through a series of six states, designated $S_1$ through $S_6$, and which can be externally set to any one of these states. A start pulse applied to the sequence counter initially sets it to the $S_1$ state.

During the $S_1$ state, the mantissas of the divider are checked to see if either one is zero and, if so, to terminate the operation. To this end, a decoding matrix 16 is connected to all the stages of the mantissas section of the A-register 10. The decoding matrix 16 provides a voltage level on one of two outputs, labeled $A_m=0$ and $A_m\neq0$, according to whether the A-register is equal to zero or not equal to zero. Similarly, a decoding matrix 18 is connected to all the stages of the mantissa section of the B-register 12. The decoding matrix 18 provides voltage levels on two outputs, labeled $B_m=0$ and $B_m\neq0$, indicating whether the mantissa is equal to zero or not equal to zero.

By means of an "or" gate 20 and an "and" gate 22, when either the mantissa of the A-register 10 or the mantissa of the B-register 12 is zero during the $S_1$ state, an Operation Clear signal, designated OC, is produced. This is achieved by connecting the $A_m=0$ and $B_m=0$ designation levels at the output of the decoding matrices 16 and 18 to the "or" gate 20 and connecting the output of the "or" gate 20 along with the $S_1$ level to the input of the "and" gate 22. The gate 22 is coupled to an "or" gate 23 to produce the OC signal. At the same time, if the mantissa of the divisor in the A-register 10 is zero, a Divide-By-Zero interrupt is generated by an "and" gate 24 to which the $S_1$ level and the $A_m=0$ level from the decoding matrix 16 are applied. The interrupt condition indicates to the associated processor that the integer or remainder divide was incapable of generating a result.

On the other hand, if the mantissa of the dividend in the B-register 12 is zero, the result of the division must be zero. This is anticipated during the $S_1$ state by clearing the exponent in the B-register 12. To this end, the $B_m=0$ level from the decoding matrix 18 together with the $S_1$ state are applied to an "and" gate 26, the output of which is used to clear the exponent in the B-register 12 through an "or" gate 28.

If the mantissa in both the registers is not zero, the sequence counter is advanced to the $S_2$ state by means of the output level generated by an "and" gate 30 to which is applied the $S_1$ level, the $B_m\neq0$ level from the decoding matrix 18, and the $A_m\neq0$ level from the decoding matrix 16.

With the sequence counter 14 in the $S_2$ state, the operands in the A-register 10 and the B-register 12 are normalized by shifting the contents of the registers to the left until the most significant non-zero digit is in the left most digit storage position not counting the overflow digit positon. This position is designated (9). A decoding matrix 32 is coupled to the digit position (9) of the A-register 10 and generates two output levels, designated $A_m(9)=0$ and $A_m(9)\neq0$. Similarly, a decoding matrix 34 is coupled to the digit position (9) of the B-register 12 and produces a level on one of two outputs, designated $B_m(9)=0$ and $B_m(9)\neq0$.

Clock pulses are applied to the shift input of the A-register 10 through a gate 36. At the same time, each pulse used to shift the mantissa portion of the operand stored in the A-register 10 to the left, is used also to decrement the exponent value by one. The gate 36 is controlled by an "and" gate 38 to which the $S_2$ level is applied along with the $A_m(9)=0$ level. Thus the A-register 10 continues to shift left until a non-zero digit is shifted into the digit position (9).

Similarly, left shift of the B-register 12 is controlled by clock pulses applied through a gate 40. The gate 40 is controlled by the output of an "and" gate 42 to which is applied the $S_2$ level and the $B_m(9)=0$ level from the decoding matrix 34. The output of the "and" gate 42 is coupled through an "or" gate 44 to control the gate 40. Clock pulses applied through the gate 40 shift the B-register 12 to the left and at the same time they decrement the exponent. This continues until a non-zero digit is shifted into position (9) of the B-register.

The contents of the A-register and the B-register are now normalized with the most significant non-zero digit in the lefthand position of the mantissas of the divisor and the dividend. If, at this time, the exponent of the divisor in the A-register is larger than the exponent of the dividend in the B-register, the result of an integer divide is zero and the result of a remainder divide is necessarily the value of the dividend in the B-register. Accordingly, no further division operations need take place. A comparison matrix 48 is used to sense and compare the exponent values of the A-register and the B-register. The comparison matrix determines whether the exponent value of the A-register is equal to, greater than, or less than the exponent value of the B-register and energizes one of three outputs accordingly. These outputs are labeled $A_e<B_e$, $A_e=B_e$, and $A_e>B_e$ in the figure. The $A_e>B_e$ output of the comparison matrix 48 is applied to an "and" gate 46. Also applied to the "and" gate 46 is the $S_2$ level, and a level which is derived from an "and" gate 50 connected to the $A_m(9)\neq0$ output of the diode matrix 32 and the $B_m(9)\neq0$ output of the diode matrix 34. If all these conditions are true, indicating that the registers have been normalized and that the exponent in the A-register is larger than the exponent in the B-register, if an integer divide is being executed, an output of the "and" gate 46 is used to clear the mantissa of the B-register, setting it to zero. To this end, the Integer Divide level from the associated processor or other input source is applied to an "and" gate 52 along with the output of the "and" gate 46. The output of the "and" gate 52 is used to clear the mantissa portion of the B-register 12 through an "or" gate 54. At the same time, the sequence counter 14 is advanced from the $S_2$ state to the $S_6$ state by the output of the "and" gate 46, which is coupled to the sequence counter through an "or" gate 56 and an "or" gate 58.

During the $S_6$ state, the exponent of the B-register is set to zero if the mantissa is at zero. This is because a mantissa of zero with some other exponent value has no meaning in normal computer operations. Also during the $S_6$ state an Operation Clear (OC) signal is generated at the output of the "or" gate 23 to indicate that the division has been completed.

An "and" gate 60 receives the $S_6$ level and the $B_m=0$ level from the decoding matrix 18, the output of the "and" gate 60 being coupled through the "or" gate 28 to clear the exponent in the B-register 12. At the same time, the $S_6$ level is used to produce an output level OC at the "or" gate 23. Thus after normalization, if the divisor is larger than the dividend, the operation is completed with the B-register containing the divisor if a remainder divide is called for or with the B-register cleared to zero if an integer divide is called for.

Assuming that after normalization has taken place in the $S_2$ state of the sequence counter and the dividend has an exponent which is equal to or larger than the exponent of the divisor, the sequence counter 14 is set to the $S_3$ state. This is accomplished by means of an "and" gate 62 to which is applied the $S_2$ level and the level from the gate 50, indicating that both the A-register and the B-register have been normalized, and a level derived from an "or" gate 64 to which the $A_e<B_e$ and $A_e=B_e$ outputs of the comparison matrix 48 is applied. The output of the "and" gate 62 is used to set the sequence counter 14 to the $S_3$ state through a logical "or" gate 66. The output from the "and" gate 62 is also used to complement the divisor as stored in the A-register 10 so that the successive subtractions required in the division operation can be carried out by additions of the complement of the divisor. The complement of the mantissa in the A-register 10 is generated by doing a complement of the decimal number stored in the A-register 10 and by applying a carry to the input of an adder circuit 68. This complementing technique in doing subtractions is well known practice.

During the $S_3$ state, the mantissa of the divisor is in effect subtracted from the mantissa of the dividend as many times as possible without having a negative result. The number of times this subtraction is carried out is a digit of the quotient. As pointed out, the subtraction is actually carried out by adding the complement of the divisor to the dividend. To this end, the mantissa in the A-register 10 and the mantissa in the B-register 12 are both applied to the input of the adder 68. The adder 68 is preferably a conventional parallel added capable of adding two coded decimal numbers plus a carry and generating a result plus a carry. The result is coupled to the B-register through a gating circuit 70. The addition of the two numbers is complete when the gate 70 is open providing a new number in the B-register, which in turn is applied to one input of the adder 68.

The gate 70 is controlled by the carry level from the output of the parallel adder plus the $S_3$ level applied through an "and" gate 72 to the gating circuit 70. Addition is repeated over and over again until the result does not produce a carry, at which time the gating circuit 70 is closed and no further addition takes place. The carry from the output of the adder 68 is used to count up a quotient digit counter 74. By counting the number of additions which produce a carry, the final count condition of the counter 74 is equal to a digit of the quotient.

The last addition by the parallel adder 68 produces no carry, designated $\overline{\text{carry}}$. The result of this addition of course does not get placed in the B-register 12. The carry condition is sensed along with the $S_3$ level by a logical "and" circuit 74, the output of which is applied to the sequence counter 14 to set the sequence counter to the $S_4$ state.

During the $S_4$ state, the quotient digit in the counter 74 is placed in a quotient or X-register 76. The X-register 76 is first shifted to the left and then the contents of the counter 74 are applied to the least significant digit position (1) by means of an "and" gate 78. At the same time, the counter 74 is cleared by the $S_4$ level applied through a slight delay 80. The delay 80 permits the contents of the counter 74 to be transferred to the X-register before clearing.

At the beginning of the $S_4$ state, a decoding matrix 82 has established whether the digit position (8) prior to the left shift of the X-register, contains a zero or a non-zero digit. One of two output lines, designated $X(8)=0$ and $X(8)\neq 0$, is set by the decoding matrix 82. If the decoding matrix 82 indicates that a zero is present in digit position (8), then further quotient digits can be generated following the left shift of the X-register without an overflow from the X-register. However, further quotient digits will be generated only if the exponents in the A-register 10 and B-register 12 are not yet equal. If the exponents are not equal, as pointed out above, this is an indication that integer division is not complete. The $A_e<B_e$ level from the comparison matrix 48 is applied to an "and" gate 84 together with the $S_4$ level and the $X(8)=0$ level from the decoding matrix 82. If all these conditions are true, the output from the "and" gate 84 sets the sequence counter back to the $S_3$ state. At the same time, the output level from the gate 84 causes a left shift of the mantissa in the B-register 12 and a decrementing of the exponent in the B-register 12 by opening the gate 40 through the "or" gate 44 long enough for one clock pulse to be applied to the shifting input of the B-register 12.

The $S_3$ state is now repeated in which another quotient digit is generated in the counter 74. At the end of the $S_3$ state, the $S_4$ state is repeated in which a test is again made to see whether the position (8) of the X-register is still zero and whether the exponent $A_e$ is still less than the exponent $B_e$, as indicated at the output of the comparison matrix 48. If the decoding matrix 82 indicates that a non-zero is present in position (8) of the X-register, and the exponents still are not equal, an overflow has been generated and no integer division can be completed since the capacity of the X-register will be exceeded. This condition is sensed by an "and" circuit 86 to which is applied the $S_4$ state together with the $X(8)\neq 0$ output of the decoding matrix 82 and the $A_e<B_e$ output of the comparison matrix 48. The output of the "and" gate 86 is used to generate an Integer Overflow interrupt signal which is used to produce an alarm in the computer system. At the same time, the output of the "and" gate 86 clears the mantissa of the B-register 12 through the "or" gate 54 and sets the sequence counter to the $S_6$ state through the "or" gate 58. During the $S_6$ state, the exponent of the B-register 12 is cleared and an Operation clear signal (OC) is produced at the output of the "or" gate 23, in the manner described above.

Assuming that at the start of the $S_4$ state, the matrix comparison circuit 48 now indicates that the exponents are equal, the digit in the counter 74 is placed in the X-register when the X-register is shifted left during the $S_4$ state as described above. The X-register 76 now contains the full integer quotient and the B-register 12 contains the remainder. In the case of remainder division, the desired answer is now provided in the B-register 12 and no further action is required other than to indicate that the operation is complete. To this end, and "and" gate 88 has applied to it the $S_4$ level, the Remainder Divide level, and the $A_e=B_e$ level from the comparison matrix 48. The output from the "and" gate 88 is used to set the sequence counter to the $S_6$ state through the "or" gate 58. As a result, an Operation Clear signal OC is generated at the output of the "or" gate 23 during the $S_6$ state, as described above.

In the case of integer divide, it is desired that the quotient in the X-register be placed in the B-register 12 and that the exponent be cleared in the B-register 12. This is accomplished by an "and" gate 90 to which is applied the $S_4$ level, the Integer Divide level, and the $A_e=B_e$ level from the comparison matrix 48. The output of the "and" gate 90 is used to clear the exponent in the B-register 12 through the "or" gate 28 and is also used to set the sequence counter 14 to the $S_5$ state. During the $S_5$ state, a gate 92 is open permitting transfer of the quotient number stored in the X-register 76 to the mantissa portion of the B-register 12. At the same time, the $S_5$ state applied to the "or" gate 58 advances the sequence counter to the $S_6$ state, resulting in the generation of an Operation Clear signal OC at the output of the "or" gate 23.

It will be recognized from the above description that applicant has provided an arrangement in which integer division or remainder division between two numbers in floating-point notation may be carried out. The result in each case is stored in the B-register 12. This is accomplished by a unique divider circuit in which two significant features are present which are not found in prior art digital divider circuits. First, the divisor and dividend are normalized in the two registers prior to the division operation. Second, a comparison is made between the value of the two exponents and division is interrupted when the exponents are equal. The result is an integer quotient and remainder in floating-point notation.

While a specific embodiment has been described in detail, the divider can be modified in many ways without departing from the spirit of the invention. For example, over-and-over subtraction is only one dividing technique which might be employed. Any type of division of the mantissas in which the quotient digits are generated in sequence could be utilized. Comparison of the exponents could be made in various ways. Integer and remainder division, according to the present invention, requires that the division be interrupted when the number of quotient digits is equal to the difference between the exponents of the dividend and divisor plus one, i.e., exponent (B-register) − exponent (A-register) + 1 = number of quotient digits. For example, the initial difference in the exponents could be set in a counter and the counter then counted down with each division operation until a negative count is generated.

What is claimed is:

1. Apparatus for obtaining the integer quotient of two numbers where each number is represented by a mantissa having a fixed number of significant digits and an exponent identifying the number of significant zeros in each of said numbers not carried in the mantissa, said apparatus comprising first and second registers for respectively storing the dividend and the divisor, first sensing means for sensing when the respective mantissas in the two registers are equal to zero, means coupled to the first sensing means for setting the exponent in the first register to zero when the mantissa is zero and indicating completion of the division operation, second sensing means for sensing when digits in the most significant digit position of the mantissa in the two registers are zero, means responsive to the first and second sensing means when the most significant digit position in the first register is zero and the mantissa in the first register is not zero for shifting the mantissa to the left and decrementing the exponent value with each shift until the most significant digit position is not zero, means responsive to the first and second sensing means when the most significant digit position in the second register is zero and the mantissa in the second register is not zero for shifting the mantissa to the left and decrementing the exponent with each shift until the most significant digit position is not zero, means for comparing the value of the exponents in the two registers and indicating whether the exponent in the first register is greater than, less than, or equal to the exponent in the second register, means responsive to the comparing means for setting the mantissa and exponent in the first register to zero if the exponent in the first register is smaller than the exponent in the second register, means responsive to the comparing means when the exponent in the first register is equal to or greater than the exponent in the second register for complementing the mantissa in the second register after the shifting of the mantissa, means for repeatedly adding the complemented mantissa in the second register to the mantissa in the first register, placing the result in the first register, and generating an output signal indicating when the number of digits in the sum exceeds the number of digits in the mantissas, means for counting the number of additions in which an output signal is generated and interrupting the addition when no output signal is generated, a quotient register, means for transferring the digit value in the counter to the quotient register when a repeated addition is interrupted, third sensing means for sensing when the quotient register is full, means responsive to the comparing means and the third sensing means when the comparing means indicates the exponent in the first register is larger than the exponent in the second register and the quotient register is not full for shifting the contents of the first register one place to the left, decrementing the exponent by one, and initiating another repeated addition, means responsive to the comparing means and the third sensing means when the comparing means indicates the exponent in the first register is larger than the exponent in the second register and the quotient register is full for setting the mantissa and the exponent of the first register to zero, and means responsive to the comparing means when the comparing means indicates the exponents in the first and second registers are equal for interrupting the repeated addition and generating a signal indicating the operation is complete.

2. Apparatus for obtaining the integer quotient of two numbers where each number is represented by a mantissa having a fixed number of significant digits and an exponent identifying the number of significant zeros in each of said numbers not carried in the mantissa, said apparatus comprising first and second registers for respectively storing the dividend and the divisor, first sensing means for sensing when the respective mantissas in the two registers are equal to zero, means coupled to the first sensing means for setting the exponent in the first register to zero when the mantissa is zero and indicating completion of the division operation, second sensing means for sensing when digits in the most significant digit position of the mantissa in the two registers are zero, means responsive to the first and second sensing means when the most significant digit position in the first register is zero and the mantissa in the first register is not zero for shifting the mantissa to the left and decrementing the exponent value with each shift until the most significant digit position is not zero, means responsive to the first and second sensing means when the most significant digit position in the second register is zero and the mantissa in the second register is not zero for shifting the mantissa to the left and decrementing the exponent with each shift until the most significant digit position is not zero, means for comparing the value of the exponents in the two registers and indicating whether the exponent in the first register is greater than, less than, or equal to the exponent in the second register, means responsive to the comparing means for setting the mantissa and exponent in the first register to zero if the exponent in the first register is smaller than the exponent in the second register, means responsive to the comparing means when the exponent in the first register is equal to or greater than the exponent in the second register for complementing the mantissa in the second register after the shifting of the mantissa, means for repeatedly adding the complemented mantissa in the second register to the mantissa in the first register, placing the result in the first register, and generating an output signal indicating when the number of digits in the sum exceeds the number of digits in the mantissas, means for counting the number of additions in which an output signal is generated and interrupting the addition when no output signal is generated, a quotient register, means for transferring the digit value in the counter to the quotient register when a repeated addition is interrupted, third sensing means for sensing when the quotient register is full, means responsive to the comparing means and the third sensing means when the comparing means indicates the exponent in the first register is larger than the exponent in the second register and the quotient register is not full for shifting the contents of the first register one place to the left, decrementing the exponent by one, and initiating another repeated addition, and means responsive to the comparing means when the comparing means indicates the exponents in the first and second registers are equal for interrupting the repeated addition and generating a signal indicating the operation is complete.

3. Apparatus for obtaining the integer quotient of two numbers where each number is represented by a mantissa having a fixed number of significant digits and an exponent identifying the number of significant zero in each of said numbers not carried in the mantissa, said apparatus comprising first and second registers for respectively storing the dividend and the divisor, first sensing means for sensing when the respective mantissas in the two registers are equal to zero, means coupled to the first sensing means for setting the exponent in the first register to zero when the mantissa is zero and indicating completion of the division operation, second sensing means for sensing when the digits in the most significant digit position of the mantissa in the two registers are zero, means responsive to the first and second sensing means when the most significant digit position in the first register is zero and the mantissa in the first register is not zero for shifting the mantissa to the left and decrementing the exponent value with each shift until the most significant digit position is not zero, means responsive to the first and second sensing means when the most significant digit position in the second register is zero and the mantissa in the second register in not zero for shifting the mantissa to the left and decrementing the exponent with each shift until the most significant digit position is not zero, means for comparing the value of the exponents in the two registers and indicating whether the exponent in the first register is greater than, or equal to the exponent in the second register, means responsive to the comparing means when the exponent in the first register is equal to or greater than the exponent in the second register for complementing the mantissa in the second register after the shifting of the mantissa, means for repeatedly adding the complemented mantissa in the second register to the mantissa in the first register, placing the result in the first register, and generating an output signal indicating when the number of digits in the sum exceeds the number of digits in the mantissas, means for counting the number of additions in which an output signal is generated and interrupting the addition when no output signal is generated, a quotient register, means for transferring the digit value in the counter to the quotient register when a repeated addition is interrupted, third sensing means for sensing when the quotient register is full, means responsive to the comparing means and the third sensing means when the comparing means indicates the exponent in the first register is larger than the exponent in the second register and the quotient register is not full for shifting the contents of the first register one place to the left, decrementing the exponent by one, and initiating another repeated addition, and means responsive to the comparing means when the comparing means indicates the exponents in the first and second registers are equal for interupting the repeated addition and generating a signal indicating the operation is complete.

4. Apparatus for obtaining the integer quotient of two numbers where each number is represented by a mantissa having a fixed number of significant digits and an exponent identifying the number of significant zeros in each of said numbers not carried in the mantissa, said apparatus comprising first and second registers for respectively storing the dividend and the divisor, first sensing means for sensing when digits in the most significant digit position of the mantissa in the two registers are zero, means responsive to the first sensing means when the most significant digit position in the first register is zero for shifting the mantissa to the left and decrementing the exponent value with each shift until the most significant digit position is not zero, means responsive to the first sensing means when the most significant digit position in the second register is zero for shifting the mantissa to the left and decrementing the exponent with each shift until the most significant digit position is not zero, means for comparing the value of the exponents in the two registers and indicating whether the exponent in the first register is greater than, less than, or equal to the exponent in the second register, means responsive to the comparing means for setting the mantissa and exponent in the first register to zero if the exponent in the first register is small than the exponent in the second register, means responsive to the comparing means when the exponent in the first register is equal to or greater than the exponent in the second register for complementing the mantissa in the second register after the shifting of the mantissa, means for repeatedly adding the complemented mantissa in the second register to the mantissa in the first register, placing the result in the first register, and generating an output signal indicating when the number of digits in the sum exceeds the number of digits in the mantissas, means for counting the number of additions in which an output signal is generated and interrupting the addition when no output signal is generated, a quotient register, means for transferring the digit value in the counter to the quotient register when a repeated addition is interrupted, third sensing means for sensing when the quotient register is full, means responsive to the comparing means and the third sensing means when the comparing means indicates the exponent in the first register is larger than the exponent in the second register and the quotient register is not full for shifting the contents of the first register one place to the left, decrementing the exponent by one, and initiating another repeated addition, means responsive to the comparing means and the third sensing means when the comparing means indicates the exponent in the first register is larger than the exponent in the second register and the quotient register is full for setting the mantissa and the exponent of the first register to zero, and means responsive to the comparing means when the comparing means indicates the exponents in the first and second registers are equal for interrupting the repeated addition and generating a signal indicating the operation is complete.

5. Apparatus for obtaining the integer quotient of two numbers where each number is represented by a mantissa having a fixed number of significant digits and an exponent identifying the number of significant zeros in each of said numbers not carried in the mantissa, said apparatus comprising first and second registers for respectively storing the dividend and the divisor, first sensing means for sensing when digits in the most significant digit position of the mantissa in the two registers are zero, means responsive to the first sensing means when the most significant digit position in the first register is zero for shifting the mantissa to the left and decrementing the exponent value with each shift until the most significant digit position is not zero, means responsive to the first sensing means when the most significant digit position in the second register is zero for shifting the mantissa to the left and decrementing the exponent with each shift until the most significant digit position is not zero, means for comparing the value of the exponents in the two registers and indicating whether the exponent in the first register is greater than, or equal to the exponent in the second register, means responsive to the comparing means when the exponent in the first register is equal to or greater than the exponent in the second register for complementing the mantissa in the second register after the shifting of the mantissa, means for repeatedly adding the complemented mantissa in the second register to the mantissa in the first register, placing the result in the first register, and generating an output signal indicating when the number of digits in the sum exceeds the number of digits in the mantissas, means for counting the number of additions in which an output signal is generated and interrupting the addition when no output signal is generated, a quotient register, means for transferring the digit value in the counter to the quotient register when a repeated addition is interrupted, third sensing means for sensing when the quotient register is full, means responsive to the comparing means and the third sensing means when the comparing means indicates the exponent in the first register is larger than the exponent in the second register and the quotient register is not full for shifting the contents of the first register one place to the left, decrementing the exponent by one, and initiating another repeated addition, and means responsive to the comparing means when the comparing means indicates the exponents in the first and second registers are equal for interrupting the repeated addition and generating a signal indicating the operation is complete.

6. Apparatus for dividing two numbers in floating-point notation to obtain an integer quotient and remainder result comprising first and second registers for storing respectively the mantissa and exponent of the dividend and the mantissa and exponent of the divisor, means for normalizing the mantissas in the two registers and adjusting the exponent values accordingly, means for comparing the exponent values to determine if the exponent in the first register is greater than or equal to the exponent in the second register, a quotient counter, a quotient register, means for subtracting the mantissa in the second register from the mantissa in the first register and replacing the mantissa in the first register with the result, control means for initiating and repeating the subtraction operation by the subtraction means as many times as possible without having a negative result, the control means advancing the counter with each subtraction operation, means responsive to the comparing means at the end of each repetitive subtraction cycle when the exponent in the first register is greater than the exponent in the second register for shifting the mantissa in the first register one digit to the left, decrementing the exponent by one digit, transferring the digit value of the counter to the quotient register and activating said control means to initiate another repetitive subtraction cycle, and means responsive to the comparing means at the end of a repetitive subtraction cycle when the exponents in the two registers are equal for interrupting the control means to prevent further repetitive subtraction cycles.

7. Apparatus for obtaining the integer quotient of two numbers where each number is represented by a mantissa having a fixed number of significant digits and an exponent identifying the number of significant zeros in each of said numbers not carried in the mantissa, said apparatus comprising first and second registers for storing the two numbers, means for comparing the exponents in the two registers to determine when the exponents are equal, means for dividing the mantissa in the first register by the mantissa in the second register and generating the quotient digits in sequence, a register for storing the quotient digits as they are generated by the dividing means, means for decrementing the exponent in the first register after each quotient digit is generated by the dividing means, and means responsive to the comparing means for interrupting the dividing means when the exponents are equal.

8. Apparatus for obtaining the integer quotient of two numbers where each number is represented by a mantissa of a fixed number of significant digits and an exponent identifying the number of significant zeros in each of said numbers not carried in the mantissa, said apparatus comprising first and second registers for storing the two numbers, means for dividing the mantissa in the first register by the mantissa in the second register and generating the quotient digits in sequence, a register for storing the quotient digits as they are generated by the dividing means, and means for interrupting the division after the number of digits generated is equal to the difference between the value of the exponents plus one.

References Cited by the Examiner

UNITED STATES PATENTS

| | | | |
|---|---|---|---|
| 3,037,701 | 6/1962 | Sierra | 235—159 |
| 3,182,180 | 5/1965 | Keir | 235—164 |

OTHER REFERENCES

May 1962, Jones et al., "Floating Point Feature on the IBM Type 1620," IBM Technical Disclosure Bulletin, vol. 4, No. 12.

ROBERT C. BAILEY, *Primary Examiner.*

M. J. SPIVAK, *Assistant Examiner.*